(12) United States Patent
Miyagawa et al.

(10) Patent No.: US 7,520,167 B2
(45) Date of Patent: Apr. 21, 2009

(54) FUEL LEVEL GAUGE FOR USE IN AUTOMOBILE

(75) Inventors: Isao Miyagawa, Kariya (JP); Mikio Muramatsu, Takahama (JP); Atsushi Yasuda, Anjo (JP)

(73) Assignee: Denso Corporation, Kariya (JP)

( * ) Notice: Subject to any disclaimer, the term of this patent is extended or adjusted under 35 U.S.C. 154(b) by 190 days.

(21) Appl. No.: 11/546,917

(22) Filed: Oct. 13, 2006

(65) Prior Publication Data

US 2007/0085532 A1 Apr. 19, 2007

(30) Foreign Application Priority Data

Oct. 14, 2005 (JP) ............................. 2005-300573
Jun. 22, 2006 (JP) ............................. 2006-172942

(51) Int. Cl.
*G01F 23/32* (2006.01)

(52) U.S. Cl. ...................... 73/317; 73/305; 324/207.25

(58) Field of Classification Search ................... 73/317; 439/32, 119
See application file for complete search history.

(56) References Cited

U.S. PATENT DOCUMENTS 6,901,796 B2 6/2005 Akagawa

2004/0007062 A1* 1/2004 Ireland et al. ................. 73/313

FOREIGN PATENT DOCUMENTS

JP 2002-107205 4/2002
JP 2002-206959 7/2002

OTHER PUBLICATIONS

English Machine Translation of JP 2002-107205 A, Claims and Detailed Description.*

* cited by examiner

*Primary Examiner*—Hezron Williams
*Assistant Examiner*—Mark Shabman
(74) *Attorney, Agent, or Firm*—Nixon & Vanderhye, PC

(57) ABSTRACT

A fuel level gauge is advantageously used in a fuel tank of an automobile. The fuel level gauge installed in a fuel tank includes a float floating on the fuel surface, a rotatable member supported by a stationary member and a detector such as a Hall element. The float is connected to the rotatable member through an arm member, and the rotatable member rotates according to positions of the float. Rotational positions of the rotatable member are detected by the detector. The arm member is electrically connected through a conducting member to a ground terminal to ground electrostatic charges that are generated by abrasion between the float and the fuel and accumulated in the arm member. The conducting member slidably connects the arm member to the ground member not to disturb smooth rotation of the rotatable member. Accuracy of the fuel level detection is maintained by grounding the electrostatic charges.

9 Claims, 6 Drawing Sheets

FUEL LEVEL GAUGE FOR USE IN AUTOMOBILE

CROSS-REFERENCE TO RELATED APPLICATIONS

This application is based upon and claims benefit of priority of Japanese Patent Applications No. 2005-300573 filed on Oct. 14, 2005 and No. 2006-172942 filed on Jun. 22, 2006, the contents of which are incorporated herein by reference.

BACKGROUND OF THE INVENTION

1. Field of the Invention

The present invention relates to a device for detecting a level of liquid contained in a vessel, and more particularly to a fuel level gauge for use in an automotive vehicle.

2. Description of Related Art

A fuel level gauge having a float floating on a surface of fuel in a fuel tank has been known hitherto. The float is connected to one end of an arm, and a permanent magnet is connected to the other end of the arm. The magnet is rotatably supported by a housing in the fuel tank. A magnetoresistive element is disposed to face the magnet to thereby detect an amount of magnetic flux passing through the magnetoresistive element. Since the amount of flux passing through the magnetoresistive element changes according to the fuel level in the fuel tank, the fuel level is detected based on the amount of the flux. An example of this type of fuel level gauge is disclosed in JP-A-2002-107205.

When the float floating on the fuel surface swings due to vibration of the vehicle, abrasion occurs between the fuel and the float, and thereby static electricity is generated. If a member connected to the arm and supporting the permanent magnet is made of a non-conductive material such as resin, electrostatic charges are accumulated in the arm. The electrostatic charges may be discharged for some reasons to a conductive terminal connected to the magnetoresistive element. If this happens, a signal representing the fuel level is disturbed, and detection accuracy of the fuel level gauge is adversely affected.

SUMMARY OF THE INVENTION

The present invention has been made in view of the above-mentioned problem, and an object of the present invention is to provide an improved fuel level gauge in which electrostatic charges are grounded to avoid a disturbance due to the electrostatic charges.

The fuel level gauge of the present invention is advantageously used in a fuel tank of an automobile vehicle. The fuel level gauge is composed of a rotatable member, a stationary member fixed to the fuel tank, a float floating on the surface of fuel in the fuel tank, an arm member connecting the float to the rotatable member, a detector such as a Hall element connected to the stationary member, a ground terminal, and a conducting member for electrically connecting the arm member to the ground terminal. The rotatable member that includes a permanent magnet rotates according to the positions of the float, i.e., according to the fuel level. The rotational position of the rotatable member is detected as a Hall voltage generated in the Hall element.

Electrostatic charges generated due to abrasion between the float and the fuel are accumulated in the arm member. The accumulated charges are always grounded through the conducting member. The conducting member slidably connects the arm member to the ground terminal not to disturb rotation of the rotatable member. The conducting member connecting the arm member to the ground terminal may be composed of a resilient conductor plate and a conductor piece connected to the arm member at a rotational center of the rotatable member. One end of the conductor plate resiliently pushes against the conductor piece, while the other end is connected to the ground terminal.

According to the present invention, the accumulated electrostatic charges are always grounded through the conducting member. Therefore, the detection accuracy of the fuel level gauge is not adversely affected by occasional discharges of the accumulated electrostatic charges. Other objects and features of the present invention will become more readily apparent from a better understanding of the preferred embodiments described below with reference to the following drawings.

DETAILED DESCRIPTION OF THE PREFERRED EMBODIMENTS

Figure 1:
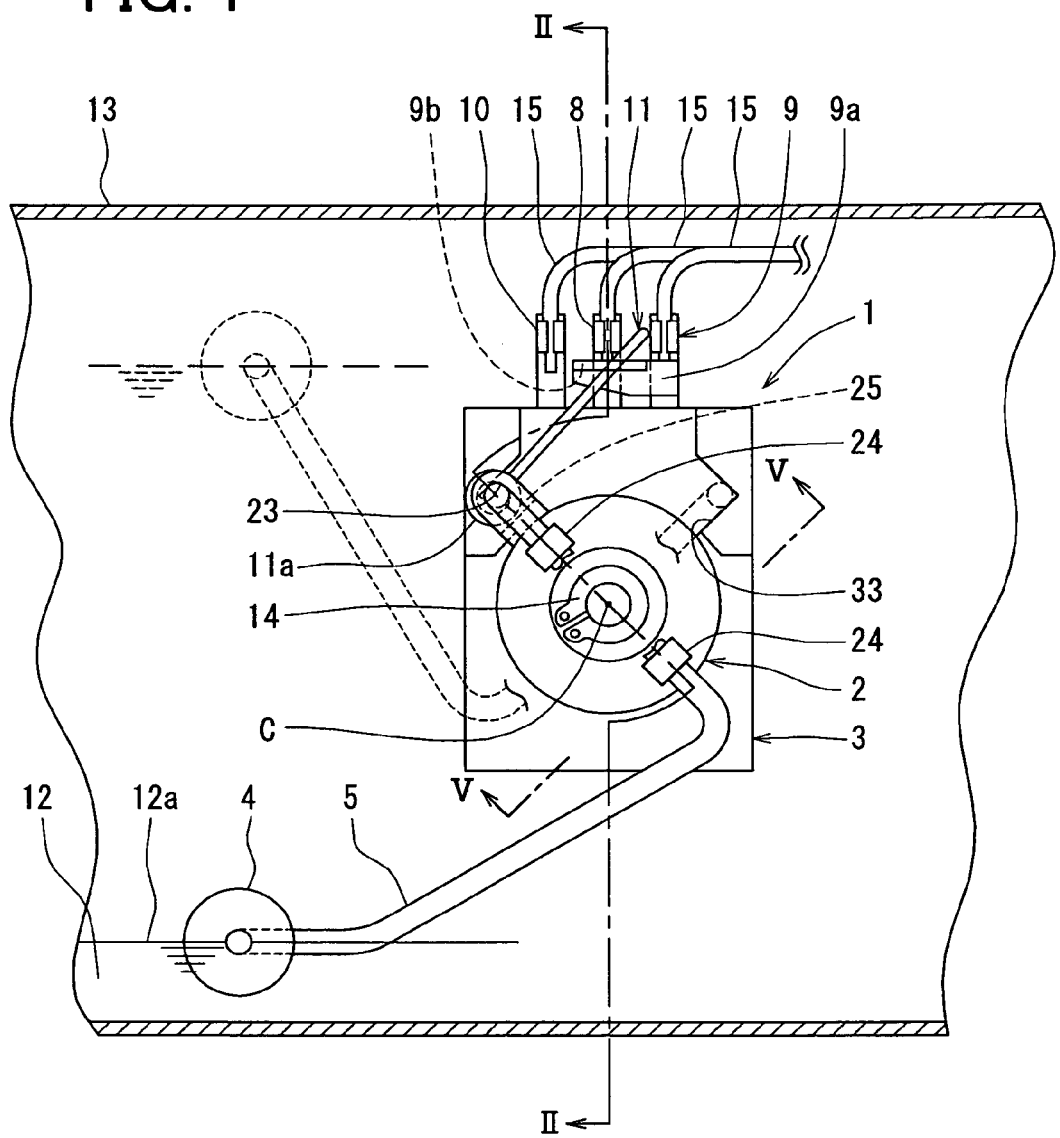
FIG. 1 is a front view showing a structure of a fuel level gauge installed in a fuel tank of an automobile, as a first embodiment of the present invention.

A first embodiment of the present invention will be described with reference to FIGS. 1-6. In this embodiment, a fuel level gauge 1 is installed in a fuel tank 13 containing fuel 12 therein. The fuel gauge 1 is composed of a float 4 floating on a fuel surface 12a, an arm member 5, a stationary member 3, a magnet holder 2 having a permanent magnet 6 and other components. The fuel level 12a shown with a solid line in FIG. 1 is the lowest level of the fuel 12, and a fuel level shown with a dotted line is the highest level. The float 4 is connected to one end of the arm member 5 moves between the lowest level and the highest level according to an amount of fuel 12. The magnet holder 2, to which the other end of the arm member 5 is connected, rotatably supported by the stationary member 3 rotates according to movement of the float 4.

Figure 2:
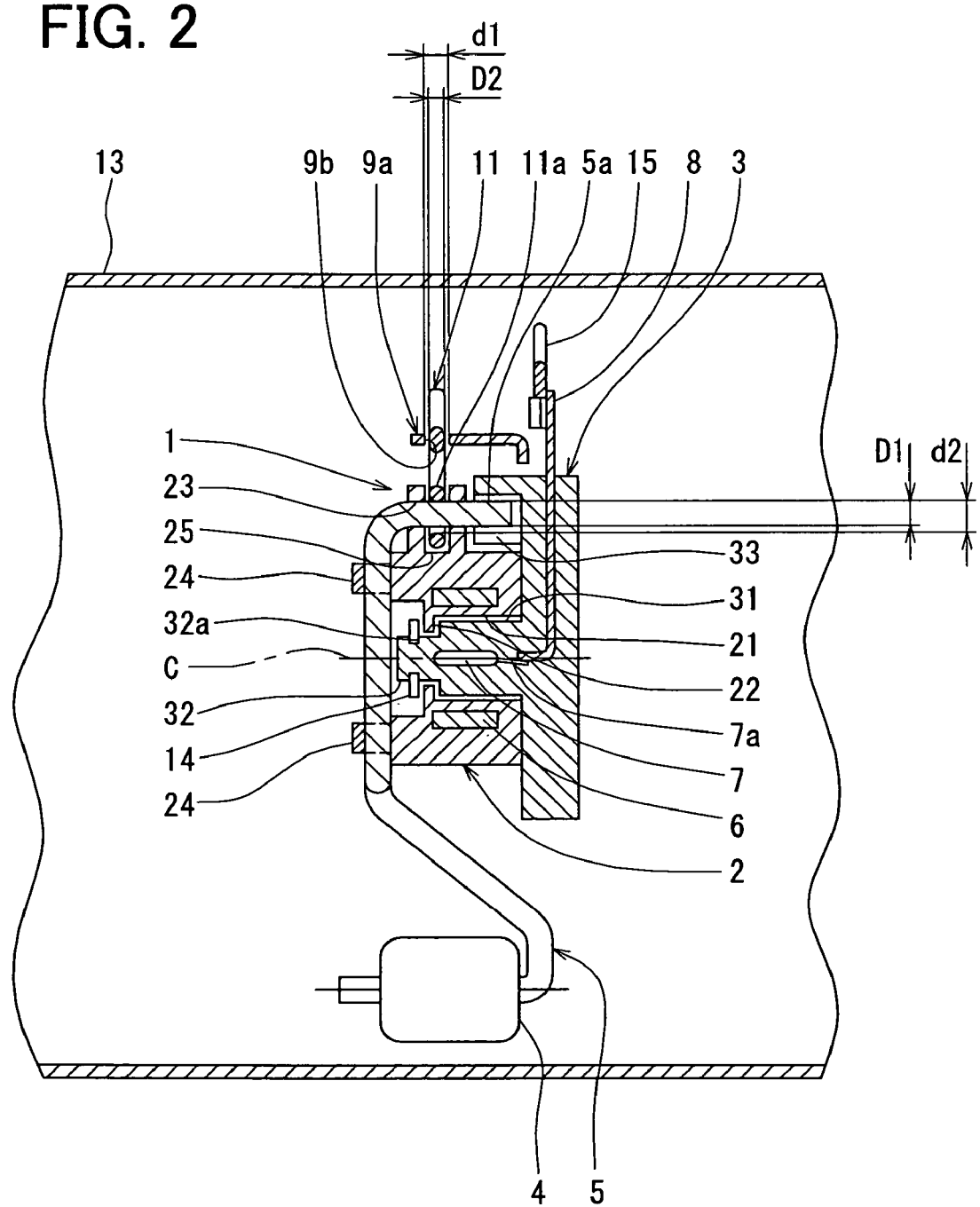
FIG. 2 is a cross-sectional view showing the fuel level gauge shown in FIG. 1, taken along line II-II shown in FIG. 1.

The magnet holder 2 constituting a rotatable member is made of a molded resin, for example. As shown in FIG. 2, a cylindrical permanent magnet 6 is embedded in the magnet holder 2. The magnet holder 2 is supported by the stationary member 3 to rotate around a center axis C, and the magnet 6 rotates together with the magnet holder 2. As shown in FIG. 1, the arm member 5 made of a metallic material such as a stainless steel rod is connected to the float 4 at its one end and to the magnet holder 2 at its other end. A cranked portion 5a is formed by bending the arm member 5 at a right angle toward the stationary member 3 (as better seen in FIG. 2). The cranked portion 5a is parallel to the center axis C and is connected to the magnet holder 2 by inserting it into a connecting hole 23 of the magnet holder 2. The cranked portion 5a abuts a stopper 33 formed on the stationary member 3 when the float 4 moves to the maximum fuel level, and thereby the movement of the magnet holder 2 is restricted.

The float 4 made of a material such as resin and connected to the arm member 5 floats on the surface 12a of the fuel 12. The magnet holder 2 rotates relative to the stationary member 3 according to the movement of the float 4. As shown in FIG. 2, the magnet holder 2 has a center hole 21 that is rotatably coupled to a boss 31 of the stationary member 3 and a stopper 22 that restricts movement of the magnet holder 2 in the axial direction. The connecting hole 23 is formed in the magnet holder 2 in parallel to the center axis C. The diameter of the connecting hole 23 is equal to or a little smaller than a diameter D1 of the arm member (that is the same as the diameter of the cranked portion 5a), so that the cranked portion 5a is easily inserted into the connecting hole 23 by hand and the arm member 5 is rotatable relative to the magnet holder 2. A groove 25 is formed between a pair of the connecting holes 23, and a ring portion 11a of a ground rod 11 is disposed therein (details will be explained later), as shown in FIG. 2.

Figure 5:
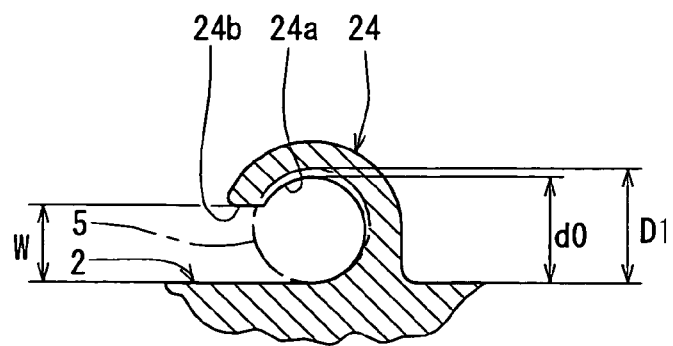
FIG. 5 is a cross-sectional view showing a claw for connecting an arm member to a magnet holder used in the fuel level gauge, taken along line V-V shown in FIG.1.

A pair of claws 24 is formed on the magnet holder 2 as shown in FIGS. 1 and 2. As shown in FIG. 5, the claw 24 is composed of a holding portion 24a having an opening 24b. A diameter dO of the holding portion 24a is made smaller than the diameter D1 of the arm member 5, and a width W of the opening 24b is smaller than the diameter dO. To connect the arm member 5 to the magnet holder 2, the arm member 5 is forcibly pushed against the opening 24b, and thereby the opening 24b is resiliently enlarged to allow the arm member 5 to pass through the opening 24b. Thus, the arm member 5 is accommodated in the holding portion 24a and is firmly held therein by resiliency of the claw 24. In this manner, the arm member 5 is easily connected to the magnet holder 2.

Figure 6:
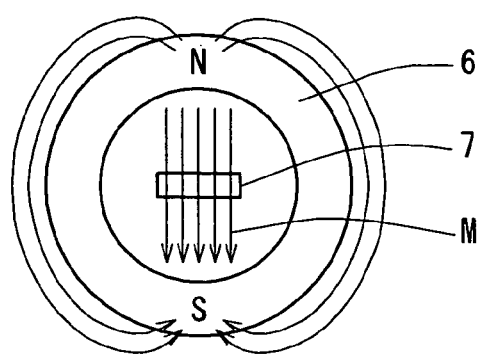
FIG. 6 is a schematic view showing magnetic flux around a permanent magnet used in the fuel level gauge.

The permanent magnet 6 is made of ferrite in a cylindrical shape and is positioned coaxially with the center hole 21. The magnet 6 is embedded in the molded resin of the magnet holder 2. As shown in FIG. 6, the magnet 6 is magnetized to have two poles. A Hall element 7 held in the stationary member 3 is positioned in the center of the cylindrical magnet 6 so that magnetic flux M flows through the Hall element 7.

The stationary member 3 is made of a material such as resin. The stationary member 3 includes a boss 31 rotatably coupled to the center hole 21 of the magnet holder 2. A small-diameter portion 32 having a groove 32a is formed at a tip portion of the boss 31. A snap ring 14 held in the groove 32a prevents the magnet holder 2 from being separated from the stationary member 3 by abutting with the stopper 22 of the magnet holder 2. As shown in FIG. 2, the Hall element 7 held in the stationary member 3 is positioned in the center of the cylindrical magnet 6, so that the longitudinal length of the Hall element 7 overlaps the axial length of the cylindrical magnet 6 as much as possible. In this manner, an amount of magnetic flux M passing through the Hall element 7 is maximized to obtain higher output signals from the Hall element 7. The Hall element 7 has lead wires 7a for supplying power from a battery and for outputting the output signals. The stationary member 3 has a pair of stopper 33 for determining a rotational angular range of the magnet holder 2.

The Hall element 7 operates in the following manner. The Hall element 7 is composed of a semiconductor element. When magnetic flux passes through the Hall element 7, to which an electric voltage is imposed, a Hall voltage proportional to the amount of the magnetic flux passing through is generated. When the magnetic flux M passes through the Hall element 7 perpendicularly thereto as shown in FIG. 6, the Hall voltage becomes highest. When the magnetic flux M is parallel to the Hall element 7, the Hall voltage becomes minimum. In the fuel level gauge 1, the amount of the magnetic flux M passing through the Hall element 7 changes according to rotation of the magnet holder 2 (i.e., according to the fuel level). Therefore, the fuel level is detected based on the Hall voltage.

As shown in FIG. 1, three terminals for connecting the Hall element 7 to outside circuits are fixed to the stationary member 3. These terminals are: a battery terminal 8 connected to a plus terminal of a battery, a ground terminal 9 connected to a minus terminal (a ground terminal) of the battery, and a signal terminal 10 for taking out the output signals of the Hall element 7. These terminals are made of a metallic material such as phosphor bronze or brass. One end of each terminal is connected to each lead wire 7a (as shown in FIG. 2) and the other end of each terminal is connected to each wire 15 (as shown in FIG. 1) by staking, fusing or the like. The wires 15 are led out of the fuel tank 13 and connected to outside electric circuits.

Figure 4:
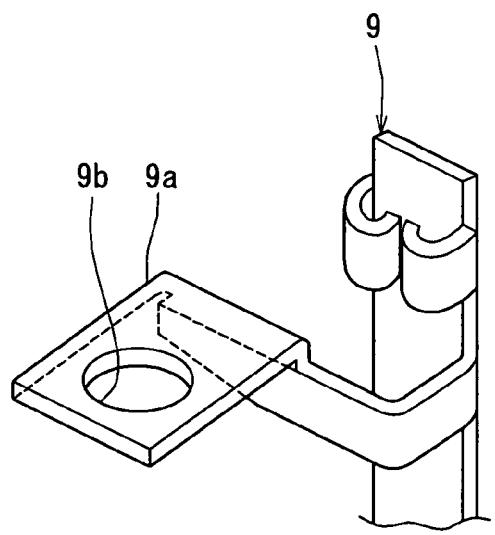
FIG. 4 is a perspective view showing a ground terminal used in the fuel level gauge.

As shown in FIG. 4, the ground terminal 9 includes an integrally formed ground plate 9a that has a hole 9b. A ground rod 11 (explained later in detail) is inserted into the hole 9b of the ground plate 9a. A diameter dl of the hole 9b is made larger than a diameter D2 of the ground rod 11. The Hall element 7 having the lead wires 7a is integrally embedded in the molded resin of the stationary element 3. The stationary member 3 is fixed to the fuel tank 13 with a bracket (not shown).

Figure 3:
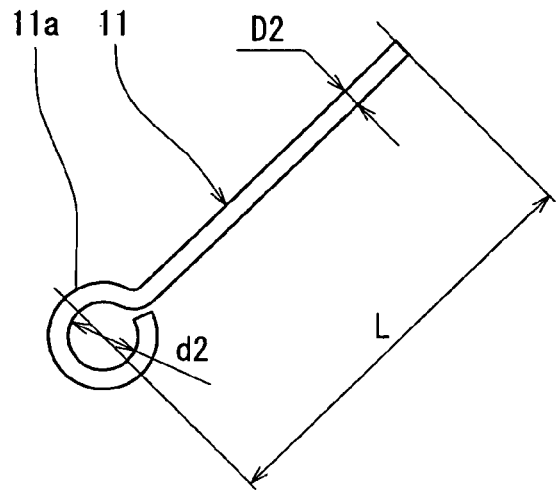
FIG. 3 is a plan view showing a ground rod used in the fuel level gauge.

As shown in FIG. 3, the ground rod 11 includes a ring portion 11a formed at its one end. The ground rod 11 is made from a metallic rod such as a stainless steel rod. A diameter d2 of the ring portion 11a is larger than the diameter D1 of the arm member 5. The cranked portion 5a of the arm member 5 is inserted into the ring portion 11a of the ground rod 11 and disposed in the groove 25 of the magnet holder 2, as shown in FIG. 2. The other end of the ground rod 11 is inserted into the hole 9b of the ground terminal 9, as shown in FIG. 1. Since the diameter d2 of the ring portion 11a is larger than the diameter D1 of the cranked portion 5a, the ground rod 11 is able to rotate around the cranked portion 5a while keeping contact with the cranked portion 5a. Since the diameter dl of the hole 9b of the ground terminal 9 is larger than the diameter D2 of the ground rod 11, the ground rod 11 is able to move relative to the hole 9b while keeping contact with it. In this manner, the arm member 5 is electrically connected to the ground terminal 9 through the ground rod 11. The length L of the ground terminal 9 is so made that the ground rod 11 does not separate from the hole 9b of the ground terminal 9 at any rotational angle of the magnet holder 2 within its rotational range.

Advantages attained in the first embodiment described above will be summarized below. Since the arm member 5 is electrically connected to the ground terminal 9 through the ground rod 11, electrostatic charges generated by abrasion between the float 4 and the fuel surface are always grounded through the ground terminal 9. Therefore, occasional discharges of the electrostatic charges accumulated in the arm member 5 through any one of the terminals can be avoided. Accordingly, the output signals of the fuel level gauge are not disturbed by the occasional discharges, and the accuracy of fuel level detection can be maintained.

Since the arm member 5 is electrically connected to the ground terminal 9 that is connected to the minus terminal of the battery which has the lowest potential, the electrostatic charges accumulated in the arm member 5 are effectively grounded. Further, the ring portion 11a of the ground rod 11 rotabably contacts the cranked portion 5a of the arm member 5, and the ground rod 11 slidably contacts the ground plate 9a. Therefore, the arm member 5 is always electrically connected to the ground terminal 9 at all the rotational positions of the magnet holder 2 (i.e., at any fuel level).

A second embodiment of the present invention will be described with reference to FIGS. 7-10. In this embodiment, the ground rod 11 used in the first embodiment is modified to a combination of a conductor plate 16 and a conductor piece 17. Other structures and functions are the same as those of the first embodiment. The electrostatic charges accumulated in the arm member 5 are grounded through the conductor plate 16 the conductor piece 17.

Figure 7:
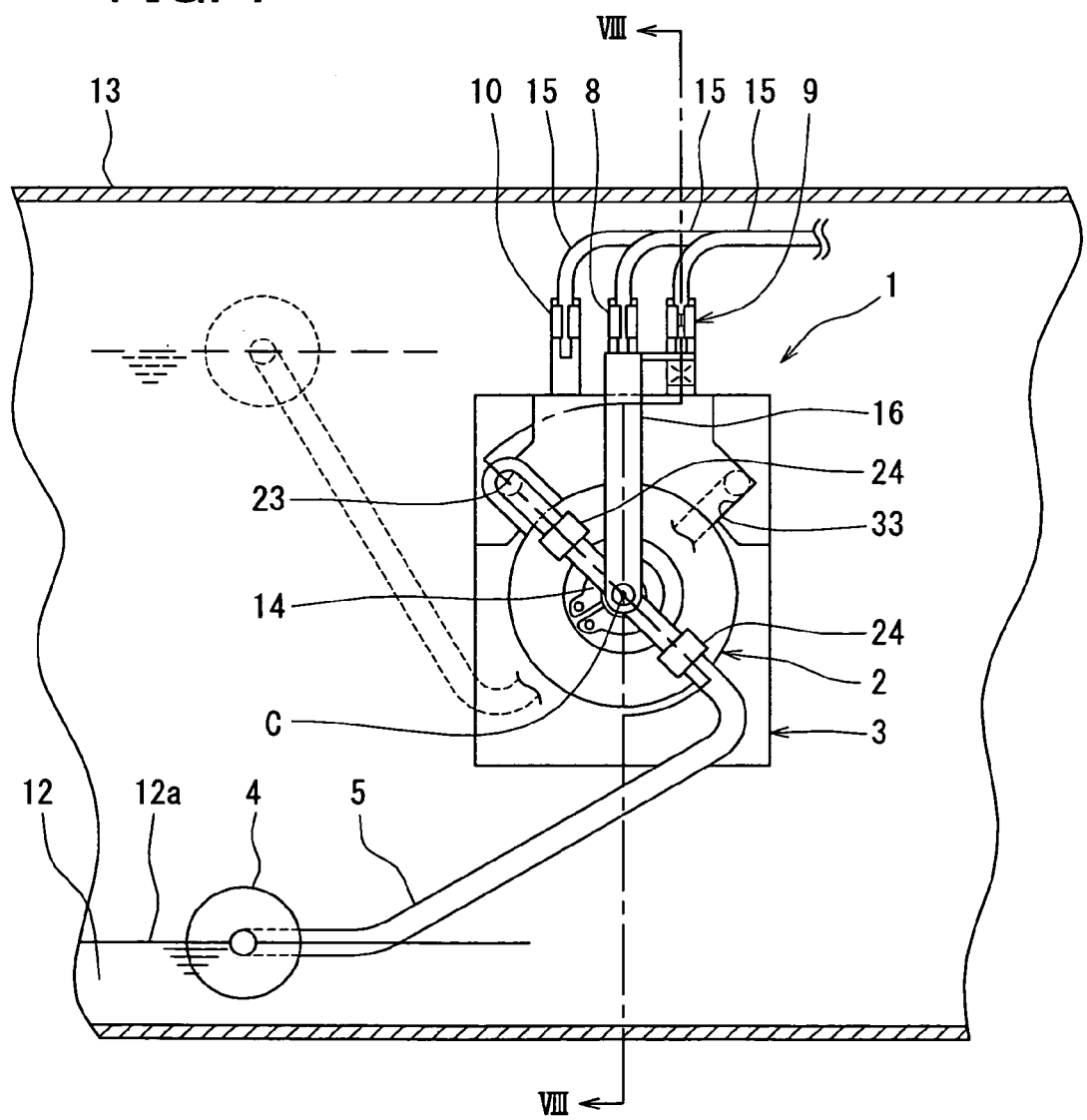
FIG. 7 is a front view showing a structure of a fuel level gauge installed in a fuel tank of an automobile, as a second embodiment of the present invention.
Figure 8:
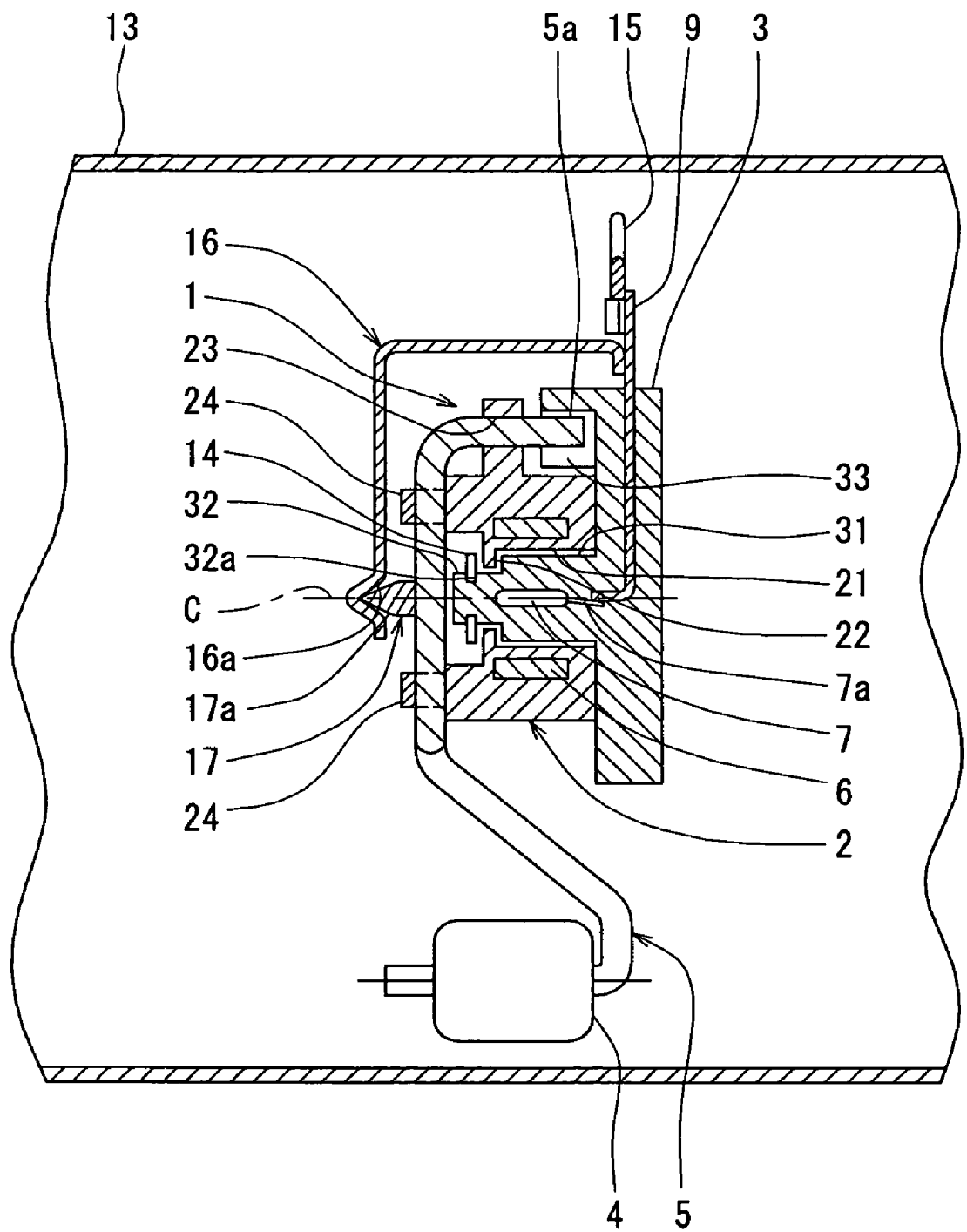
FIG. 8 is a cross-sectional view showing the fuel level gauge shown in FIG. 7, taken along line VIII-VIII shown in FIG. 7.
Figure 9:
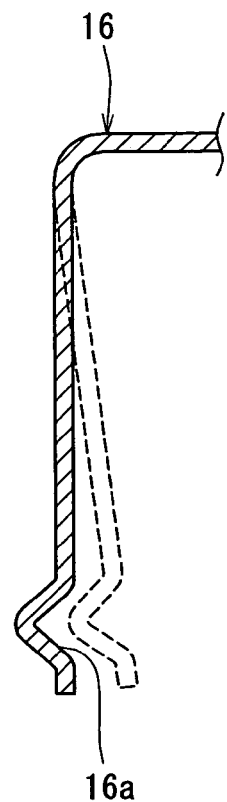
FIG. 9 is a cross-sectional view partially showing a conductor plate used in the fuel level gauge shown in FIG. 7.

The conductor plate 16 is made of a material having resiliency such as brass and is formed in an L-shape as shown in FIG. 9. One end of the conductor plate 16 is electrically connected to the ground terminal 9 by welding or other methods as shown in FIGS. 7 and 8. At the other end of the conductor plate 16, a depression 16a having a circular conical shape is formed. A conductor piece 17 having a projection 17a in a circular conical shape is fixed to the rotational center C of the arm member 5 connected to the magnet holder 2. The conductor piece 17 is made of a metallic material and fixed to the arm member 5 by welding, staking or the like.

Figure 10:
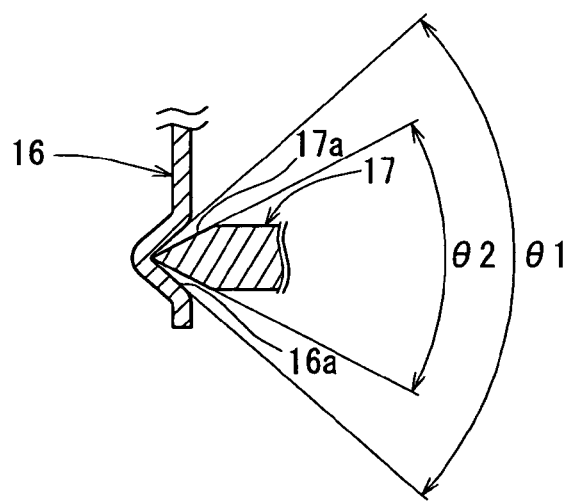
FIG. 10 is a cross-sectional view partially showing a conductor piece contacting the conductor plate, used in the fuel level gauge shown in FIG. 7.

As shown in FIG. 10, the depression 16a of the conductor plate 16 resiliently contacts the projection 17a of the conductor piece 17. A cone angle θ1 of the depression 16a is made larger than a cone angle θ2 of the projection 17a, so that the conductor piece 17 contacts the conductor plate 16 (point to point contact) exactly at the rotation center C while minimizing an abrasion resistance between the conductor plate 16 and the conductor piece 17. In this manner, the arm member 5 is surely connected to the ground terminal 9 to effectively ground the electrostatic charges accumulated in the arm member 5. Since the conductor plate 16 pushes the conductor piece 17 with its resiliency, the contact therebetween is not interrupted by vibration of the vehicle.

Though the depression is formed on the conductor plate 16 and the projection is formed on the conductor piece 17 in the second embodiment, it is, of course, possible to reverse the positions of the depression and the projection.

The present invention is not limited to the embodiments described above, but it may be variously modified. For example, The Hall element 7 may be replaced with a magnetoresistive element (MRE) or a magnetic diode. Though the permanent magnet 6 is made of a ferrite magnet, it may be replaced with other magnets such as a rare-earth magnet, an alnico magnet or a bond magnet. The number of terminals connected to the stationary member 3 is not limited to three as in the embodiments described above as long as the ground rod 11 is electrically connected to a terminal having the lowest potential. Application of the present invention is not limited to the fuel level gauge for use in an automobile, but it may be applied to other devices. For example, a brake fluid level or a cooling water level may be similarly detected. Further, the present invention may be applied to other devices than those for automotive use.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A fuel level gauge comprising:
   a rotatable member;
   a stationary member for rotatably supporting the rotatable member;
   a float floating on a surface of fuel in a fuel tank;
   an arm member for connecting the float to the rotatable member so that changes in positions of the float are converted to rotation of the rotatable member;
   means, connected to the stationary member, for detecting rotational positions of the rotatable member to thereby detect a fuel level of the fuel in the fuel tank, the detecting means including a battery terminal, a ground terminal and a signal terminal; and
   means for electrically connecting the arm member to the ground terminal to ground electrostatic charges accumulated on the arm member, wherein:
   the electrically connecting means is an elongated metal member having a ring portion formed at one end thereof;
   the ground terminal includes a hole having a diameter larger than a diameter of the metal member; and
   the ring portion of the metal member is rotatably coupled to the arm member and the other end of the metal member is inserted into the hole of the ground terminal to be slidably connected thereto.

2. The fuel level gauge as in claim 1, wherein:
   the rotatable member includes a cylindrical permanent magnet rotating together with the rotatable member.

3. The fuel level gauge as in claim 2, wherein:
   the detecting means is a Hall element through which magnetic flux of the permanent magnet passes.

4. A fuel level gauge comprising:
   a rotatable member;
   a stationary member for rotatably supporting the rotatable member;
   a float floating on a surface of fuel in a fuel tank;
   an arm member for connecting the float to the rotatable member so that changes in positions of the float are converted to rotation of the rotatable member;
   means, connected to the stationary member, for detecting rotational positions of the rotatable member to thereby detect a fuel level of the fuel in the fuel tank, the detecting means including a battery terminal, a ground terminal and a signal terminal; and
   means for electrically connecting the arm member to the ground terminal to ground electrostatic charges accumulated on the arm member, wherein:
   the arm member is made of a metallic material; and
   the electrically connecting means is a resilient conductor plate, one end of which is pushed against the arm member and the other end of which is electrically connected to the ground terminal.

5. The fuel level gauge as in claim 4, wherein:
   the rotatable member includes a cylindrical permanent magnet rotating together with the rotatable member.

6. A fuel level gauge comprising:
   a rotatable member;
   a stationary member for rotatably supporting the rotatable member;
   a float floating on a surface of fuel in a fuel tank;

an arm member for connecting the float to the rotatable member so that changes in positions of the float are converted to rotation of the rotatable member;

means, connected to the stationary member, for detecting rotational positions of the rotatable member to thereby detect a fuel level of the fuel in the fuel tank, the detecting means including a battery terminal, a ground terminal and a signal terminal; and means for electrically connecting the arm member to the ground terminal to ground electrostatic charges accumulated on the arm member, wherein:

the arm member is made of a metallic material;

the electrically connecting means comprises a resilient conductor plate and a conductor piece connected to the arm member; and one end of the conductor plate is resiliently pushed against the conductor piece, and the other end of the conductor plate is connected to the ground terminal.

7. The fuel level gauge as in claim 6, wherein:

the conductor piece is positioned at a rotational center of the rotatable member; and the conductor plate is electrically connected to the conductor piece by means of point contact.

8. The fuel level gauge as in claim 7, wherein:

the conductor plate has a depression, and the conductor piece has a projection; and the depression and the projection are pushed against each other to establish an electrical contact.

9. The fuel level gauge as in claim 6, wherein:

the rotatable member includes a cylindrical permanent magnet rotating together with the rotatable member.

* * * * *